(12) United States Patent
Wang et al.

(10) Patent No.: US 11,041,939 B2
(45) Date of Patent: Jun. 22, 2021

(54) SIGNAL DEMODULATION DEVICE HAVING IQ MIXER AND DEMODULATION METHOD USING THE SAME

(71) Applicant: NATIONAL SUN YAT-SEN UNIVERSITY, Kaohsiung (TW)

(72) Inventors: Fu-Kang Wang, Kaohsiung (TW); Tzyy-Sheng Horng, Kaohsiung (TW); Pin-Hsun Juan, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 399 days.

(21) Appl. No.: 16/181,434

(22) Filed: Nov. 6, 2018

(65) Prior Publication Data
US 2020/0103493 A1    Apr. 2, 2020

(30) Foreign Application Priority Data

Sep. 28, 2018   (TW) .................................. 107134256

(51) Int. Cl.
  *G01S 7/35*   (2006.01)
  *G01S 13/88*   (2006.01)
  *G01S 13/58*   (2006.01)

(52) U.S. Cl.
  CPC .............. *G01S 7/352* (2013.01); *G01S 7/358* (2021.05); *G01S 13/583* (2013.01); *G01S 13/88* (2013.01)

(58) Field of Classification Search
  CPC ........ G01S 7/352; G01S 13/32; G01S 13/584; G01S 2007/358; H03L 7/24
  See application file for complete search history.

(56) References Cited

U.S. PATENT DOCUMENTS

| 5,052,050 A | * | 9/1991 | Collier | H03D 3/008 |
| | | | | 455/296 |
| 2017/0102457 A1 | * | 4/2017 | Li | G01S 7/35 |
| 2018/0224526 A1 | | 8/2018 | Wang et al. | |
| 2020/0236545 A1 | * | 7/2020 | Xu | G16H 50/30 |

FOREIGN PATENT DOCUMENTS

| CN | 102331290 A | 1/2012 |
| TW | I495451 B | 8/2015 |
| TW | I514193 B | 12/2015 |
| TW | I634344 B | 9/2018 |
| WO | 2012/055148 A1 | 5/2012 |

OTHER PUBLICATIONS

Taiwanese Office Action dated Jul. 16, 2019 for Taiwanese Patent Application No. 107134256, 8 pages.

* cited by examiner

*Primary Examiner* — Erin F Heard
*Assistant Examiner* — Donald H B Braswell
(74) *Attorney, Agent, or Firm* — Demian K. Jackson; Jackson IPG PLLC

(57) ABSTRACT

A signal demodulation device includes an IQ mixer, a differential element and a signal processor. The IQ mixer is configured to output a first mixed signal and a second mixed signal. The differential element is electrically connected to the IQ mixer for receiving the first and second mixed signals and configured to differentiate the first and second mixed signals and output a first derivative signal and a second derivative signal. The signal processor is electrically connected to the differential element for receiving the first and second derivative signals and configured to demodulate the first and second derivative signals and output a first demodulated signal.

12 Claims, 5 Drawing Sheets

_US 11,041,939 B2_

SIGNAL DEMODULATION DEVICE HAVING IQ MIXER AND DEMODULATION METHOD USING THE SAME

FIELD OF THE INVENTION

This invention generally relates to a signal demodulation device and a demodulation method using the same, and more particularly to a signal demodulation device having an IQ mixer and a demodulation method using the same.

BACKGROUND OF THE INVENTION

Continuous-wave (CW) radars are widely adopted for noncontact detection of vital signs. Due to the Doppler effect resulted from subject's displacement, the wireless signals involve the Doppler shift components caused by relative movement and the subject's displacement can be monitored by demodulating the wireless signals. If the CW radar architecture has only one mixer for signal demodulation, the subject's displacement may not be measured because the issue of null detection point may occur when there is a particular distance between the CW radar and the subject. For this reason, the conventional CW radar usually uses two mixers to mix the detection signals in quadrature and output IQ signals, and the Doppler shift components caused by the relative movement of the CW radar and the subject can be acquired through arctangent demodulation of the IQ signals to monitor the subject's displacement. However, the hardware imperfections and clutter effects may lead to DC offset in the IQ signals, and the offset calibration is unavailable because the DC offset is varied in different conditions, as a result, the subject's displacement may not be measured.

SUMMARY

The present invention utilizes a differential element and a signal processor to cancel DC components in a first mixed signal and a second mixed signal and demodulate the first and second mixed signals to obtain a subject' displacement.

A signal demodulation device of the present invention includes an IQ mixer, a differential element and a signal processor. The IQ mixer is configured to output a first mixed signal and a second mixed signal. The differential element is electrically connected to the IQ mixer for receiving the first and second mixed signals and configured to differentiate the first and second mixed signals to output a first derivative signal and a second derivative signal. The signal processor is electrically connected to the differential element for receiving the first and second derivative signals and configured to demodulate the first and second derivative signals to output a first demodulated signal.

The signal processor in the present invention is designed to cancel the DC components in the first and second mixed signals such that the subject's displacement can be acquired from the demodulated signal without DC offset.

DETAILED DESCRIPTION OF THE INVENTION

Figure 1:
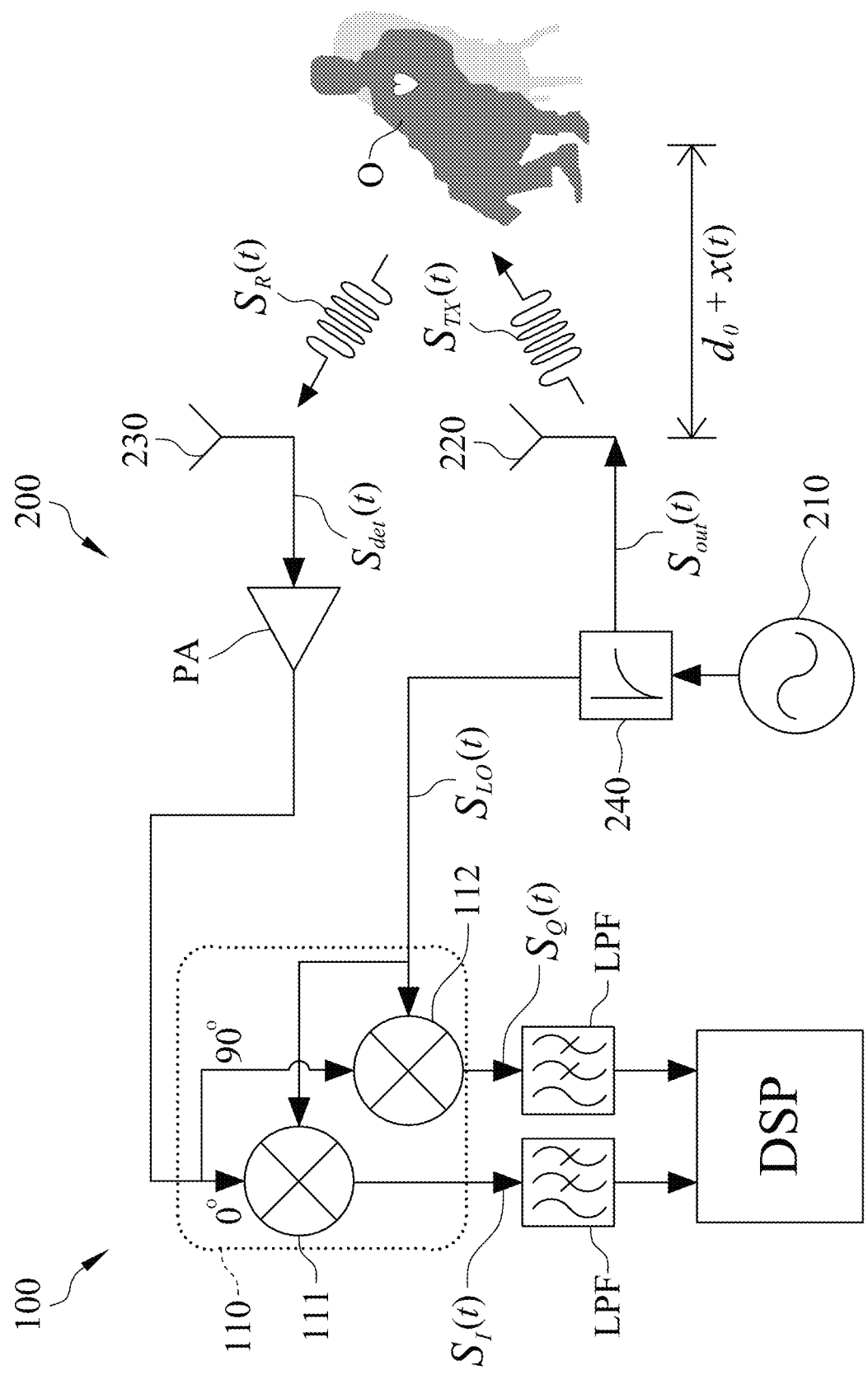
FIG. 1 is a circuit diagram illustrating a signal demodulation device connected with a radar RF transceiver in accordance with an embodiment of the present invention.

FIG. 1 represents a circuit diagram of a signal demodulation device 100 of an embodiment of the present invention. The signal demodulation device 100 is designed to demodulate the output signals from a radar RF transceiver 200. In this embodiment, an output signal $S_{out}(t)$ is generated from an oscillator 210 of the radar RF transceiver 200 and transmitted to a transmit (TX) antenna 220. The TX antenna 220 radiates the output signal $S_{out}(t)$ as a transmit signal $S_{TX}(t)$ to a subject O. In FIG. 1, $d_0$ denotes an initial distance from the subject O to the TX antenna 220 and a displacement function $x(t)$ is used to represent a displacement fluctuation between the subject O and the TX antenna 220 such that the distance between the subject O and the TX antenna 220 should demote as $d_0+x(t)$. After radiating the transmit signal $S_{TX}(t)$ to the subject O, a reflect signal $S_R(t)$ is reflected from the subject O to a receive (RX) antenna 230 and received by the RX antenna 230 as a detection signal $S_{det}(t)$. Because of the Doppler effect caused by the relative movement between the subject O and the radar RF transceiver 200, the reflect signal $S_R(t)$ reflected from the subject O and the detection signal $S_{det}(t)$ received by the RX antenna 230 both contains Doppler phase shift components. Consequently, the signal demodulation device 100 can demodulate the detection signal $S_{det}(t)$ to monitor the displacement fluctuation. The radar RF transceiver 200 is not limited in the present invention, and it may be different architecture in other embodiments.

With reference to FIG. 1, the signal demodulation device 100 includes a digital signal processor DSP and an IQ mixer 110 having a first mixer 111 and a second mixer 112. In this embodiment, the output signal $S_{out}(t)$ generated by the oscillator 210 is transmitted to a first power splitter 240 and divided into two output signals by the power splitter 240. One signal is transmitted to the TX antenna 220 and radiated as the transmit signal $S_{TX}(t)$ by the TX antenna 220, the other signal is transmitted to the first mixer 111 and the second mixer 112 as a local oscillation signal $S_{TX}(t)$. The detection signal $S_{det}(t)$ from the RX antenna 230 is transmitted to a quadrature power splitter (drawn not shown) via a power amplifier PA. The quadrature power splitter is configured to output two signals with 90 degrees phase difference (0° and 90°) and transmit the two signals to the first mixer 111 and the second mixer 112 respectively. The first mixer 111 mix the 0° signal and the local oscillation signal $S_{LO}(t)$ and output a first mixed signal $M(t)$, the second mixer 112 mix the 90° signal and the local oscillation signal $S_{LO}(t)$ and output a second mixed signal $S_Q(t)$. The first mixed signal $S_I(t)$ and the second mixed signal $S_Q(t)$ are transmitted to the digital signal processor DSP through two low-pass filters LPF respectively.

The first mixed signal $S_I(t)$ and the second mixed signal $S_Q(t)$ can be represented as follows:

$$S_I(t) = DC_I - V\sin\alpha_d(t)$$

$$S_Q(t) = DC_Q + V\cos\alpha_d(t)$$

where $DC_I$ is a first DC component of the first mixed signal $S_I(t)$, $DC_Q$ is a second DC component of the second mixed signal $S_Q(t)$, V is an amplitude, $\alpha_d(t)$ is the Doppler shift component in the reflect signal $S_R(t)$ and the detection signal $S_{det}(t)$. The Doppler shift component can by represented as follows:

$$\alpha_d(t) = \frac{2\omega_{osc}}{c}(d_0 + x(t))$$

where $\omega_{osc}$ is the operation frequency, c is the light speed, $d_0$ is the distance from the subject O to the TX antenna 220, and x(t) is the displacement function of the subject O.

Figure 2:
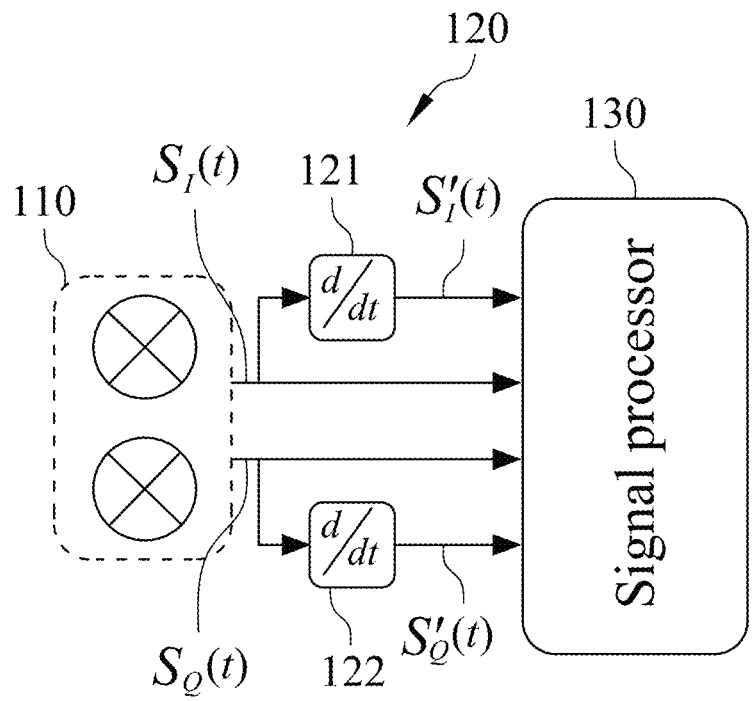
FIG. 2 is a schematic diagram illustrating an IQ mixer, a differential element and a signal processor in accordance with an embodiment of the present invention.

With reference to FIG. 2, the digital signal processor DSP includes a differential element 120 and a signal processor 130. The differential element 120 includes a first differentiator 121 and a second differentiator 122, the first differentiator 121 is electrically connected to the first mixer 111 for receiving the first mixed signal $S_1(t)$, the second differentiator 122 is electrically connected to the second mixer 112 for receiving the second mixed signal $S_Q(t)$. The first differentiator 121 is configured to differentiate the first mixed signal $S_I(t)$ and output a first derivative signal $S_I'(t)$. The second differentiator 122 is configured to differentiate the second mixed signal $S_Q(t)$ and output a second derivative signal $S_Q'(t)$. The first derivative signal $S_Q'(t)$ and the second derivative signal $S_Q'(t)$ can be represented as follows:

$$S_I'(t) = -V\cos\left[\frac{2\omega_{osc}}{c}(d_0 + x(t))\right] \times \frac{2\omega_{osc}}{c}x'(t)$$

$$S_Q'(t) = -V\sin\left[\frac{2\omega_{osc}}{c}(d_0 + x(t))\right] \times \frac{2\omega_{osc}}{c}x'(t)$$

where x'(t) is the differential of the displacement function of the subject O, and the representations of the first derivative signal $S_I'(t)$ and the second derivative signal $S_Q'(t)$ show that the DC components in the first mixed signal $S_I(t)$ and the second mixed signal $S_Q(t)$ have been cancelled by differentiating.

Figure 3:
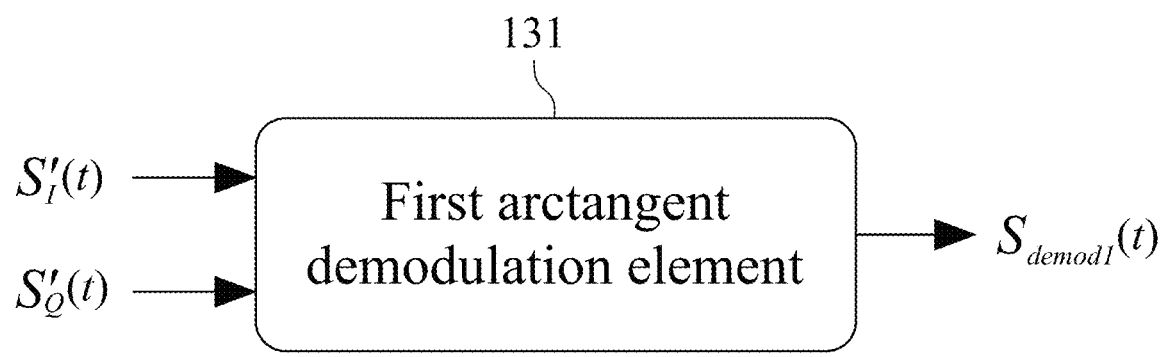
FIG. 3 is a schematic diagram illustrating a first arctangent demodulation element in accordance with an embodiment of the present invention.

With reference to FIG. 3, the signal processor 130 in this embodiment includes a first arctangent demodulation element 131 electrically connected to the differential element 120 for receiving the first derivative signal $S_I'(t)$ and the second derivative signal $S_Q'(t)$. The first arctangent demodulation element 131 is configured to perform arctangent demodulation of the first derivative signal $S_I'(t)$ and the second derivative signal $S_Q'(t)$ to acquire a first demodulated signal $S_{demod1}(t)$. The arctangent demodulation of the first derivative signal $S_I'(t)$ and the second derivative signal $S_Q'(t)$ performed by the signal processor 130 is represented as follows:

$$S_{demod1}(t) = \text{atan}\left(\frac{S_Q'(t)}{S_I'(t)}\right)$$

where $S_{demod1}(t)$ is the first demodulated signal, $S_I'(t)$ is the first derivative signal, $S_Q'(t)$ is the second derivative signal.

According to the previous mentioned representations of the first derivative signal $S_I'(t)$ and the second derivative signal $S_Q'(t)$, they are clearly shown that the first DC component $DC_I$ and the second DC component $DC_Q$ have been cancelled by differential. As a result, when the signal-to-noise ratios (SNR) of the first mixed signal $S_I(t)$ and the second mixed signal $S_Q(t)$ are great, the first demodulated signal $S_{demod1}(t)$ can be regarded as the demodulated signal, in other words, the first demodulated signal $S_{demod1}(t)$ can be regarded as the Doppler shift component $\alpha_d(t)$ caused by the relative movements of the subject O.

Figure 5:
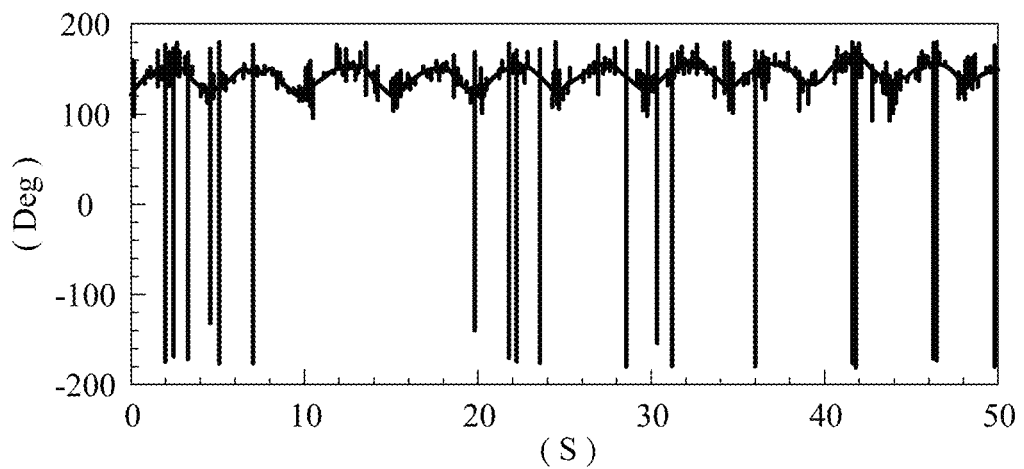
FIG. 5 is a waveform diagram of a first demodulated signal.

The differential of the first mixed signal $S_I(t)$ and the second mixed signal $S_Q(t)$ not only eliminates the DC offset in the signals, but also intensify the high-frequency clutter in the first mixed signal $S_I(t)$ and the second mixed signal $S_Q(t)$. FIG. 5 is the waveform diagram of the first demodulated signal $S_{demod1}(t)$ demodulated by the device in this embodiment, and there are significant surges in the first demodulated signal $S_{demod1}(t)$ that means the displacement function x(t) of the subject O acquired from the first demodulated signal $S_{demod1}(t)$ is not available.

Figure 4:
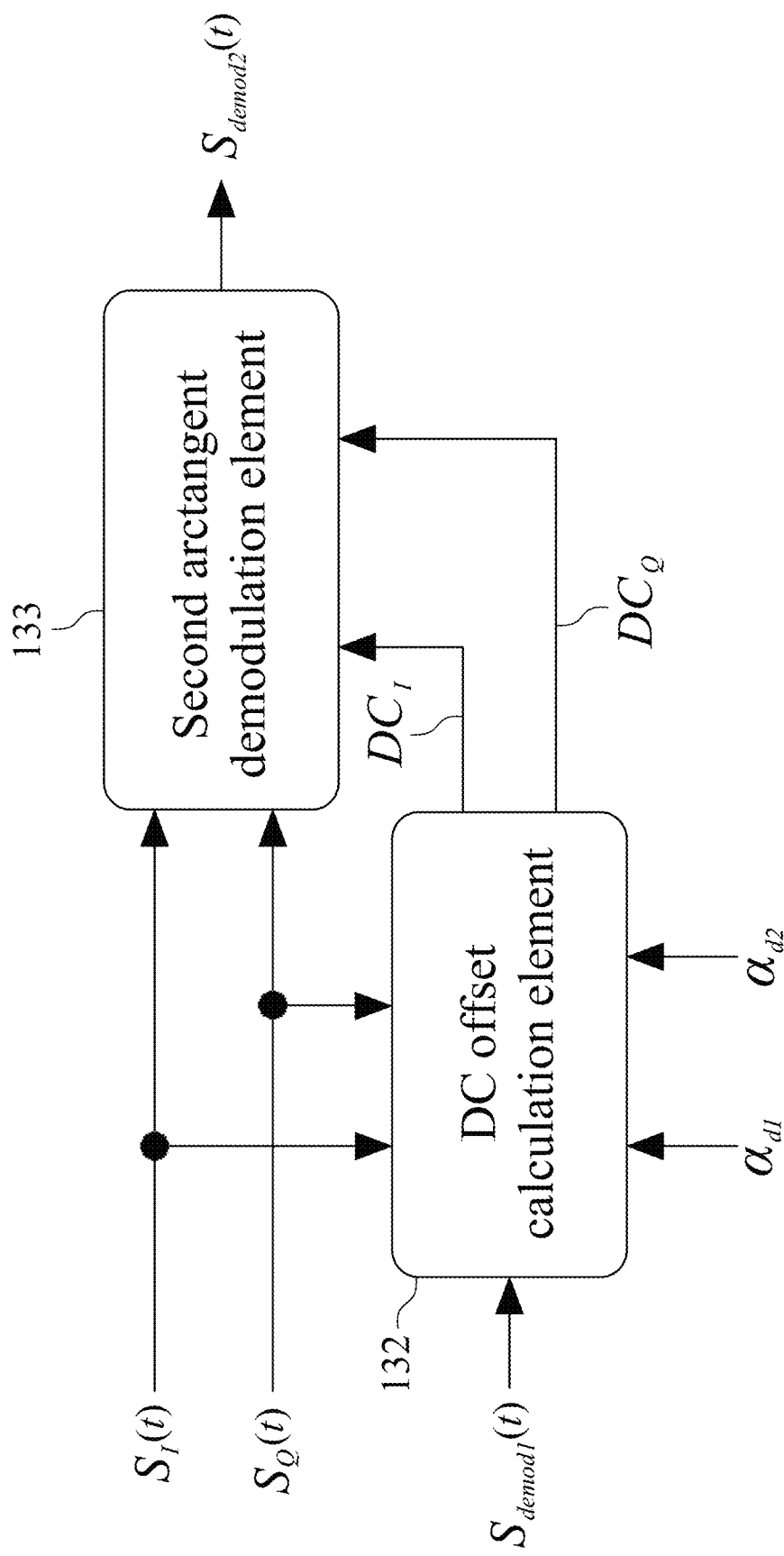
FIG. 4 is a schematic diagram illustrating a DC offset calculation element and a second arctangent demodulation element in accordance with an embodiment of the present invention.

With reference to FIG. 4, the signal processor 130 preferably further includes a DC offset calculation element 132 and a second arctangent demodulation element 133. The DC offset calculation element 132 is electrically connected to the first arctangent demodulation element 131 and the IQ mixer 110 for receiving the first mixed signal $S_I(t)$, the second mixed signal $S_Q(t)$ and the first demodulated signal $S_{demod1}(t)$. The DC offset calculation element 132 is configured to calculate the first DC component $DC_I$ of the first mixed signal $S_I(t)$ and the second DC component $DC_Q$ of the second mixed signal $S_Q(t)$ based on the first demodulated signal $S_{demod1}(t)$.

In this embodiment, the first DC component $DC_I$ and the second DC component $DC_Q$ are calculated as follows: the DC offset calculation element 132 selects a first phase $\alpha_{d1}$ and a second phase $\alpha_{d2}$ from the first demodulated signal $S_{demod1}(t)$, and then substitutes the first phase $\alpha_{d1}$ and the second phase $\alpha_{d2}$ into the first mixed signal $S_I(t)$ and the second mixed signal $S_Q(t)$ to get the following simultaneous equations:

$$\begin{cases} DC_I - V\sin\alpha_{d1} = \overline{S}_I(t)|_{|S_{demod1}(t) - \alpha_{d1}| < \theta_t} \\ DC_I - V\sin\alpha_{d2} = \overline{S}_I(t)|_{|S_{demod1}(t) - \alpha_{d2}| < \theta_t} \end{cases}$$

$$\begin{cases} DC_Q - V\cos\alpha_{d1} = \overline{S}_Q(t)|_{|S_{demod1}(t) - \alpha_{d1}| < \theta_t} \\ DC_Q - V\cos\alpha_{d2} = \overline{S}_Q(t)|_{|S_{demod1}(t) - \alpha_{d2}| < \theta_t} \end{cases}$$

where $\theta_t$ is the phase threshold, and the first DC component $DC_I$ of the first mixed signal $S_I(t)$ and the second DC component $DC_Q$ of the second mixed signal $S_Q(t)$ can be calculated by solving the simultaneous equations.

With reference to FIG. 4, the second arctangent demodulation element 133 is electrically connected to the DC offset calculation element 132 for receiving the first DC component $DC_I$ and the second DC component $DC_Q$. The second arctangent demodulation element 133 is configured to demodulate the first mixed signal $S_I(t)$ and the second mixed signal $S_Q(t)$ by using the first DC component $DC_I$ and the second DC component $DC_Q$ to obtain a second demodulated signal $S_{demod2}(t)$. In this embodiment, the demodulation formula of the first mixed signal $S_I(t)$ and the second mixed signal $S_Q(t)$ is represented as follows:

$$S_{demod2}(t) = \operatorname{atan}\left(\frac{-(S_I(t) - DC_I)}{(S_Q(t) - DC_Q)}\right)$$

where $S_{demod2}(t)$ is the second demodulated signal, $S_I(t)$ is the first mixed signal, $S_Q(t)$ is the second mixed signal, $DC_I$ is the first DC component, $DC_Q$ is the second DC component. The first DC component $DC_1$ and the second DC component $DC_Q$ are subtracted from the first mixed signal MO and the second mixed signal $S_Q(t)$ before the demodulation such that the second demodulated signal $S_{demod2}(t)$ can be regarded as the Doppler shift component $\alpha_d(t)$ caused by the relative movement of the subject O to calculate the displacement function x(t) of the subject O.

If the displacement of the subject O is more than quarter-wavelength, the phase variation of the first demodulated signal $S_{demod1}$ (t) is over 180 degrees. Preferably, the first phase and the second phase may be set to 0° and 90° respectively to simplify the simultaneous equations.

Figure 6:
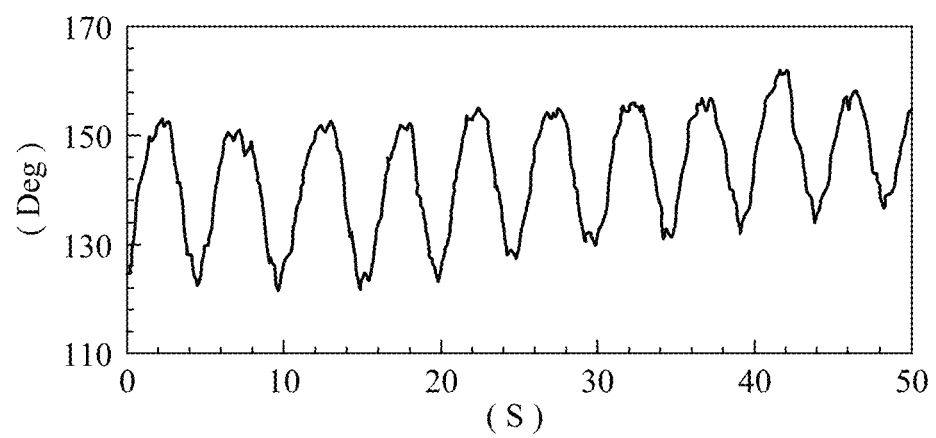
FIG. 6 is a waveform diagram of a second demodulated signal.
Figure 7:
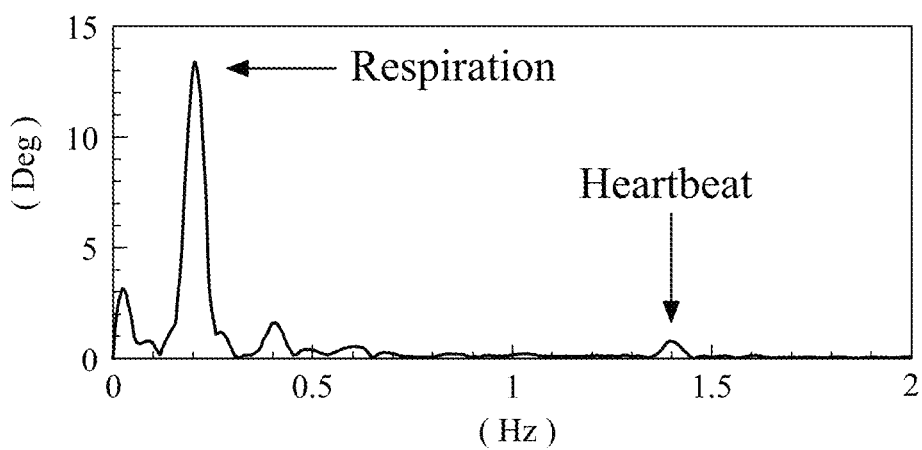
FIG. 7 is an output spectrum of a vital signal.

With reference to FIG. 6, it is a waveform diagram of the second demodulated signal $S_{demod2}(t)$ that is obtained by demodulating the first mixed signal $S_1(t)$ and the second mixed signal $S_Q(t)$ without the first DC component $DC_I$ and the second DC component $DC_Q$. As shown in FIG. 6, there is no surge in the second demodulated signal $S_{demod2}(t)$. FIG. 7 is an output spectrum of the second demodulated signal $S_{demod2}(t)$ and there are significant peaks caused by respiration and heartbeat of the subject O. It is clear to know that the signal demodulation device 100 of the present invention is able to eliminate the first DC component $DC_I$ and the second DC component $DC_Q$ in the first mixed signal $S_I(t)$ and the second mixed signal $S_Q(t)$.

The present invention utilizes the signal processor 130 to cancel the first DC component $DC_I$ and the second DC component $DC_Q$ in the first mixed signal $S_I(t)$ and the second mixed signal $S_Q(t)$ such that the displacement of the subject O can be monitored by signal demodulation without DC offset.

The scope of the present invention is only limited by the following claims. Any alternation and modification without departing from the scope and spirit of the present invention will become apparent to those skilled in the art.

What is claimed is:

1. A signal demodulation device, comprising:
an IQ mixer configured to output a first mixed signal and a second mixed signal;
a differential element electrically, connected to the IQ mixer for receiving the first and second mixed signals, the differential element is configured to differentiate the first and second mixed signals and output a first derivative signal and a second derivative signal; and
a signal processor electrically connected to the differential element for receiving the first and second derivative signals, the signal processor is configured to demodulate the first and second derivative signals and output a first demodulated signal,
wherein the signal processor includes a first arctangent demodulation element, a DC offset calculation element and a second arctangent demodulation element, the first arctangent demodulation element is electrically connected to the differential element for receiving the first and second derivative signals, and the first arctangent element configured to arctangent demodulate the first and second derivative signals for obtaining the first demodulated signal, the DC offset calculation element configured to electrically connect to the first arctangent demodulation element and the IQ mixer, and extract a first DC component of the first mixed signal and a second DC component of the second mixed signal according to the first demodulated signal, the second arctangent demodulation element is electrically connected to the DC offset calculation element for receiving the first and second DC components and configured to demodulate the first and second mixed signals by using the first and second DC components to obtain a second demodulated signal.

2. The signal demodulation device in accordance with claim 1, the signal processor is configured for an arctangent demodulation of the first and second derivative signals.

3. The signal demodulation device in accordance with claim 2, wherein the arctangent demodulation of the first and second derivative signals is performed by the signal processor according to the following formulas $$S_{demod1}(t) = \operatorname{atan}\left(\frac{S'_Q(t)}{S'_I(t)}\right)$$

wherein $S_{demod1}(t)$ is the first demodulated signal, $S'_I(t)$ is the first derivative signal and $S'_Q(t)$ is the second derivative signal.

4. The signal demodulation device in accordance with claim 1, wherein the IQ mixer includes a first mixer and a second mixer configured to output the first mixed signal and the second mixed signal respectively.

5. The signal demodulation device in accordance with claim 2, wherein the IQ mixer includes a first mixer and a second mixer configured to output the first mixed signal and the second mixed signal respectively.

6. The signal demodulation device in accordance with claim 1, wherein the DC offset calculation element is configured to receive the first demodulated signal from the first arctangent demodulation element and choose a first phase and a second phase within the first demodulated signal, and the DC offset calculation element is configured to substitute the first and second phases into the first and second mixed signals to calculate the first and second DC components.

7. The signal demodulation device in accordance with claim 6, wherein the first phase is 0° and the second phase is 90°.

8. The signal demodulation device in accordance with claim 1, wherein the demodulation of the first and second mixed signals is performed by the second arctangent demodulation element according to the following formulas $$S_{demod2}(t) = \operatorname{atan}\left(\frac{-(S_I(t) - DC_I)}{(S_Q(t) - DC_Q)}\right)$$

wherein $S_{demod2}(t)$ is the second demodulated signal, $S_I(t)$ is the first mixed signal, $S_Q(t)$ is the second mixed signal, $DC_I$ is the first DC component and $DC_Q$ is the second DC component.

9. A demodulation method using signal demodulation device, comprising:
an IQ mixer outputting a first mixed signal and a second mixed signal;
a differential element receiving and differentiating the first and second mixed signals to output a first derivative signal and a second derivative signal; and a signal processor receiving and demodulating the first and second derivative signals to output a first demodulated signal, wherein the signal processor includes a first arctangent demodulation element, a DC offset calculation element and a second arctangent demodulation element, the first arctangent demodulation element is configured to demodulate the first and second derivative signals and output the first demodulated signal, the DC offset calculation element is configured to extract a first DC component of the first mixed signal and a second DC component of the second mixed signal according to the first demodulated signal, the second arctangent demodulation element is configured to demodulate the first and second mixed signals by using the first and second DC components to obtain a second demodulated signal.

10. The demodulation method in accordance with claim 9, wherein the DC offset calculation element is configured to choose a first phase and a second phase within the first demodulated signal and substitute the first and second phases into the first and second mixed signals to calculate the first and second DC components.

11. The demodulation method in accordance with claim 10, wherein the first phase is 0° and the second phase is 90°.

12. The demodulation method in accordance with claim 9, wherein the demodulation of the first and second mixed signals is performed by the second arctangent demodulation element according to the following formulas $$S_{demod2}(t) = \mathrm{atan}\left(\frac{-(S_I(t) - DC_I)}{(S_Q(t) - DC_Q)}\right)$$

wherein $S_{demod2}(t)$ is the second demodulated signal, $S_I(t)$ is the first mixed signal, $S_Q(t)$ is the second mixed signal, $DC_I$ is the first DC component and $DC_Q$ is the second DC component.

* * * * *